(12) United States Patent
Kristensen

(10) Patent No.: US 8,117,799 B2
(45) Date of Patent: Feb. 21, 2012

(54) METHOD OF ERECTING A TOWER

(75) Inventor: Jonas Kristensen, Skjern (DK)

(73) Assignee: Vestas Wind Systems A/S, Aarhus N (DK)

( * ) Notice: Subject to any disclaimer, the term of this patent is extended or adjusted under 35 U.S.C. 154(b) by 0 days.

(21) Appl. No.: 13/126,841

(22) PCT Filed: Oct. 20, 2009

(86) PCT No.: PCT/EP2009/063727
§ 371 (c)(1),
(2), (4) Date: Apr. 29, 2011

(87) PCT Pub. No.: WO2010/049313
PCT Pub. Date: May 6, 2010

(65) Prior Publication Data
US 2011/0203219 A1    Aug. 25, 2011

(30) Foreign Application Priority Data

Oct. 31, 2008  (DK) ................................ 2008 01502

(51) Int. Cl.
*E04H 12/34* (2006.01)
(52) U.S. Cl. .................................. 52/745.17; 52/745.04
(58) Field of Classification Search ............... 52/651.01, 52/651.07, 745.04, 745.17; 249/20
See application file for complete search history.

(56) References Cited

U.S. PATENT DOCUMENTS 3,213,575 A    10/1965  Boczek
(Continued)

FOREIGN PATENT DOCUMENTS

DE    197 41 988    4/1999
(Continued)

OTHER PUBLICATIONS

David Bradley; International Preliminary Report on Patentability issued in priority International Application No. PCT/EP2009/063727; May 3, 2011; 7 pages; European Patent Office.

(Continued)

*Primary Examiner* — Jeanette E Chapman
*Assistant Examiner* — James Buckle, Jr.
(74) *Attorney, Agent, or Firm* — Wood, Herron & Evans, L.L.P.

(57) ABSTRACT

The disclosure relates to a method of erecting a tower comprising; —providing a foundation (1); —providing at least one top section (20) of a tower; —providing a first lifting mechanism (10) adapted to carry the top section (20); —providing at least one lower most tower section (25) onto the foundation (1); —lifting said at least one top section (20) of the tower by lifting the first lifting mechanism (10) relative said at least one lower most tower section (25); —adding at least one second lower most section (24) above said at least one lower most tower section (25); —lifting said at least one top section (20) of the tower by lifting the first lifting mechanism (10) relative said at least one second lower most tower section (25). Preferably a second lifting mechanism is carried by a nacelle which is rotatably arranged on the top section, thereby allowing the second lifting mechanism to be orientated in different orientations relative the top section.

16 Claims, 5 Drawing Sheets

U.S. PATENT DOCUMENTS

| | | | | |
|---|---|---|---|---|
| 3,248,831 | A * | 5/1966 | Jones | 52/121 |
| 3,354,599 | A * | 11/1967 | Martin | 52/745.17 |
| 3,464,169 | A * | 9/1969 | Potain | 52/115 |
| 4,028,792 | A | 6/1977 | Tax et al. | |
| 5,333,422 | A * | 8/1994 | Warren et al. | 52/115 |
| 6,408,575 | B1 * | 6/2002 | Yoshida et al. | 52/40 |
| 6,614,125 | B2 * | 9/2003 | Willis et al. | 290/55 |
| 6,928,774 | B1 * | 8/2005 | Weiss et al. | 52/111 |
| 2008/0078128 | A1 * | 4/2008 | Livingston et al. | 52/40 |

FOREIGN PATENT DOCUMENTS

| | | |
|---|---|---|
| EP | 1 561 883 | 8/2005 |
| EP | 1 857 670 | 11/2007 |
| WO | 2007/125138 | 11/2007 |
| WO | 2008/040349 | 4/2008 |

OTHER PUBLICATIONS

Lennart Bitsch; 1st Technical Examination and Search Report issued in priority Denmark Application No. PA 2008 01502; Jun. 9, 2009; 4 pages; Denmark Patent and Trademark Office.

David Bradley; International Search Report and Written Opinion issued in priority International Application No. PCT/EP2009/063727; Jan. 13, 2011; 11 pages; European Patent Office.

* cited by examiner

METHOD OF ERECTING A TOWER

TECHNICAL FIELD

The invention relates to a method of erecting a tower. The tower may for instance be used as a tower of a wind turbine plant.

BACKGROUND TECHNOLOGY

WO20041076781 discloses a system for erecting a wind power plant. The wind power plant comprises a tower, which consists of a number of segments arranged one above the other and which is placed on a foundation. The system comprises a lifting device that is designed to lift the part of the already built tower upwardly such that a lower tower section may be placed beneath and fastened to the upper tower sections. Then the thus built tower is once again lifted and another lower tower section is placed beneath and fastened to the upper tower sections, i.e. to the section added as the lower section in previous lifting procedure.

WO2004/101990 discloses a method and device for erecting a steel tower comprising a conical steel shell. The steel tower is intended to support the machine housing of a wind power plant. The steel tower is erected by adding plating to the underside of a vertical top part. The top part is supported and held upright by a supporting and lifting device. The bottom most portion of the tower is added to the tower as the already built upper portion of the tower is lifted to create a distance to accommodate the lower. The steel shell forming the tower is provided as sheet like plates extending along the circumference of the tower and having a pitch such that they basically follow a thread line.

US2005/0005562 discloses a support tower for heavy loads or large structures such as wind turbine generators. The support tower is constructed of a plurality of telescopic tower sections with the outer lower section having a lower end supported by a foundation. At least one or more inner upper tower sections are initially telescoped in an vertical nested relation within the outer lower tower section. The heavy load is mounted on an upper end of the inner upper tower section while in the initial vertical nested relation. The inner upper tower section or sections are then lifted upwardly to an extended tower height by lift mechanisms and the tower sections are secured in vertically extended position by inter-engaging wedge joint structure with bolt fasteners extending through mating wedge surfaces to retain the telescopic tower sections vertically extended and position the heavy load in a vertically elevated position.

U.S. Pat. No. 6,357,549 discloses a guide rails system to be used for erecting towers, placing equipment on towers and for maintenance of towers for wind turbine plants. The guide rails may be added to existing towers, a climbing lifting platform is attached to the guide rails and is used to transport items up and down the tower. The platform may also be used to carry up tower sections during erection of the tower. Once the tower is erected the guide rails system is used to lift up a short uppermost tower section carrying the nacelle thereby finalising the tower.

SUMMARY OF THE INVENTION

It is an object of the invention to provide a new method of erecting a tower. This object has been met with a method of erecting a tower comprising
 a) providing a foundation,
 b) providing at least one top section of a tower,
 c) providing a first lifting mechanism adapted to carry the top section,
 d) providing at least one lower most tower section onto the foundation,
 e) lifting said at least one top section of the tower by lifting the first lifting mechanism relative said at least one lower most tower section,
 f) adding at least one second lower most section above said at least one lower most tower section,
 g) lifting said at least one top section of the tower by lifting the first lifting mechanism relative said at least one second lower most tower section.

Thus the tower is built by first building the top section and then lifting it upwardly while building the tower from beneath; section by section. Any lifting mechanism may be used but in a preferred embodiment a climber is used to climb on the already built parts of the tower. The climber carries the already built top section. The climber will during the construction of the tower carry the weight of the already built top section. The load carried by the climber will be independent of the height of the tower. Thus, the inventive method is especially suitable when erecting large towers, such as large wind turbine towers. Since the top section is lifted upwardly while building the tower it is possible to design the climber such that the load is carried by the tower in the same manner it is carried once the tower is finalised.

It should be noted that the steps a-d may be provided in any given order. In one preferred embodiment the steps are provided in the order a, b, c, d. In another preferred embodiment the steps are provided in the order a, c, b, d. It is preferred that the foundation is provided as the initial step. It is also preferred that the lower most section is mounted after the top section and climber has been provided.

In one preferred embodiment, the first lifting mechanism comprises a climber having body and a first set of arms extending outwardly from the body, and wherein lifting said at least one top section of the tower comprises: engaging the first set of arms with the lower most tower section; and moving the body upwardly relative to the first set of arms while they are engaging the lower most tower section.

In one preferred embodiment the climber further comprises a second set of arms extending outwardly from the body, and wherein lifting said at least one top section of the tower further comprises: engaging the second set of arms with the lower most tower section; disengaging the first set of arms from the lower most tower section; and moving the body upwardly relative to the second set of arms while they are engaging the lower most section.

In one preferred embodiment, said steps of engagement and disengagement of the arms and said upward movement of the body are repeated until a space is formed between the lower most tower section and the top section allowing a new tower section to be built in said space.

By this reciprocating movement between the arms and the body and the tower section respectively, the climber is allowed to, step by step, climb mounted tower sections while lifting the top section.

In one preferred embodiment, there is a reciprocal interaction between the body and the arms along the vertical extension of the body, and along the longitudinal extension of the arms.

In one preferred embodiment the top section carries a nacelle. Thereby the bulky and heavy load is transported upwardly while the tower is built and thereby need not be lifted onto the tower once it has been built. Preferably the nacelle is also carrying the rotor blade.

In one preferred embodiment the first lifting mechanism is a climber climbing on the inside of respective lower tower section. With this design the inventive method does not require any additional space compared to the final tower. Moreover, the load bearing capacity of the tower may be utilised in an efficient manner.

In one preferred embodiment the first lifting mechanism or climber extends beneath the top section. With this design the first lifting mechanism or climber may engage section(s) below the top tower section and keep the top tower section in place while the second upper most tower section is being built.

In one preferred embodiment the first lifting mechanism or climber extends inside the top tower section. With this design the top tower section may be mounted to the second upper most tower section, without the first lifting mechanism or climber interfering with the connection between the top tower section and the second upper most tower section.

In one preferred embodiment the lower most tower section or sections are provided by two or more portions divided by interfaces having an vertical extension at least such that each portion only forms a portion of the circumference formed by respective section. In the preferred embodiment disclosed in the detail description the vertical extension is purely vertical. By providing the tower sections in portions as discussed above respective tower section may be built piece by piece from the outside thereby avoiding any interference from the top tower section (optionally also carrying the nacelle and rotor).

In one preferred embodiment the portions adapted to form the respective tower section are lifted with a second lifting mechanism carried by the nacelle (on the outside or inside of the nacelle). Alternatively or additionally, said portions may be lifted with a second lifting mechanism carried by the top section. Alternatively or additionally, said portions may be lifted with a second lifting mechanism carried by the first lifting mechanism or climber. The second lifting mechanism(s) may be unitary or separate mechanism(s) or carried by the nacelle and/or top section and/or first lifting mechanism or climber.

In one preferred embodiment the tower, or at least parts thereof, is conical tower with an upward and inward inclination. This is beneficial from a load carrying and material consumption perspective.

In one preferred embodiment the tower is a plate shell tower. By building the tower of plates forming a shell it is possible to build a large and strong tower using relatively easy to handle plates.

In one preferred embodiment rotation of the nacelle in an essentially horizontal plane relative the top section provides means for different orientations of the second lifting mechanism carried by the nacelle. Thereby the already present mechanisms used for orientation of the nacelle and rotor relative the wind is used while erecting the tower. This mechanism is also known as the yaw mechanism.

In one preferred embodiment at least parts of the second lifting mechanism is kept in or on the nacelle after the tower is erected and ready for use. In many cases a wind turbine plant is provided with a crane mechanism in the nacelle. This crane is for instance used to hoist spare parts when performing service on the wind turbine plant. Preferably at least parts of this crane mechanism is used as the second lifting mechanism or at least as parts of the second lifting mechanism used for erecting the tower. Thus, such parts of the second lifting mechanism remain in or on the nacelle after the tower is erected. In yet another preferred embodiment, the climber, during climbing engages grip portions forming part of, or being mounted to the plate shell sections. The use of grip portions allow a secure holding of the climber during its climbing.

BRIEF DESCRIPTION OF THE DRAWINGS

The invention will by way of example be described in more detail with reference to the appended schematic drawings, which shows a presently preferred embodiment of the invention.

DETAILED DESCRIPTION

In a preferred embodiment a tower, such as a tower for a wind turbine plant, is in short built by initially building the top section and then continue from bottom up using a climber adapted to on one hand carry the already built top section and on the other hand climb on the lower tower sections as they are added one on top of the other until a complete tower is built with the initially built top section securely resting at the top of the tower.

Figure 1:
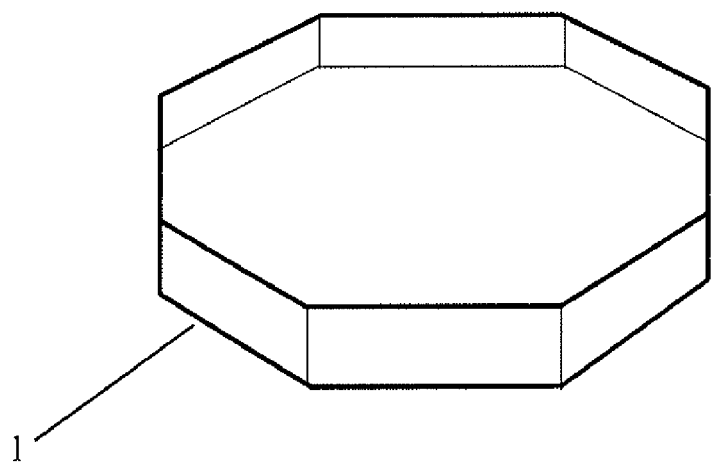
FIG. 1 shows a foundation adapted to support a wind turbine tower.

FIG. 1 shows a foundation 1 which will support the complete tower. The foundation 1 is disclosed as having an octagonal cross sectional shape. It may alternatively be circular. It may also have other polygonal shapes.

Figure 2:
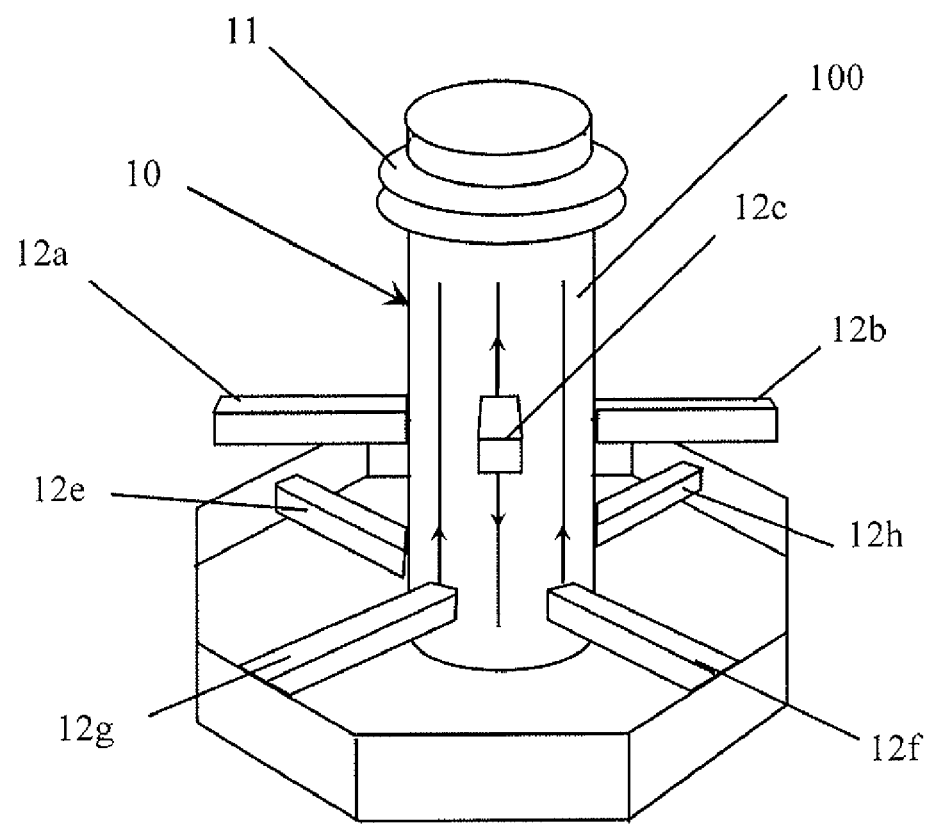
FIG. 2 shows a climber mounted on the foundation and ready to receive a top tower section.

In FIG. 2, a first lifting mechanism in form of a climber 10 has been installed. The climber 10 basically comprises a body 100 and a holding portion 11 adapted to carry a top section of the tower. The holding portion 11 is located at the upper portion of the body 100 of the climber 10.

The climber 10 further comprises a climbing mechanism 12a-h. In the disclosed embodiment the climbing mechanism comprises eight arms adapted to be moved up and down along the body 100 of the climber 10 in two groups, i.e. four by four. The first group of arms 12a-d are independently movable along the body 100 in view of the second group of arms 12e-h. Alternatively, said body 100 can be movable relative to said arms. It is to be understood that more than two sets of arms can be arranged and that the number of eight arms are not limiting.

Figure 3:
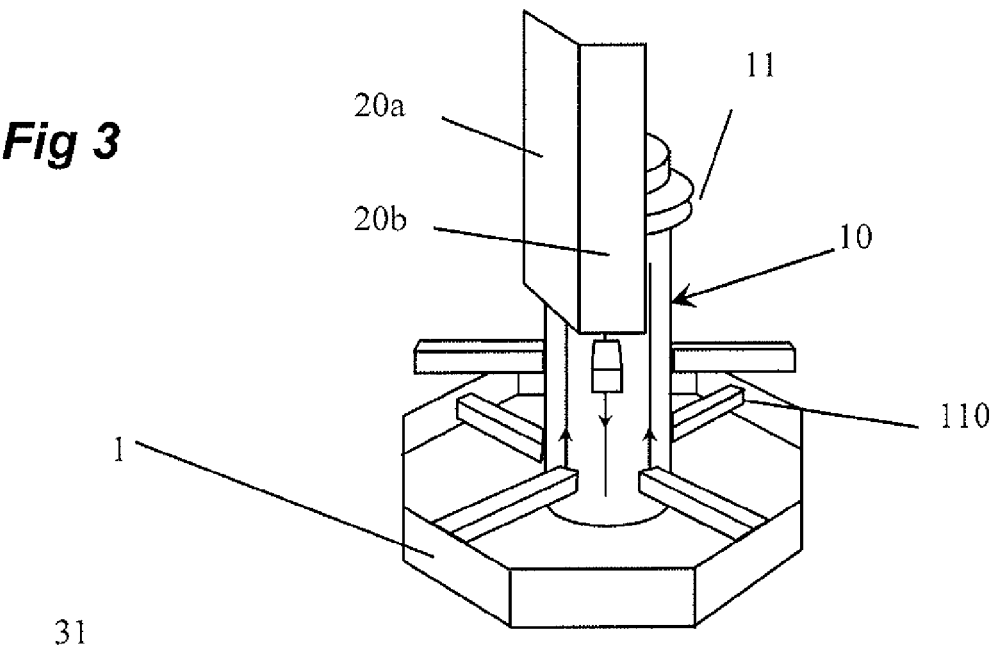
FIG. 3 shows the climber in a state where it has partly received a top tower section.
Figure 4:
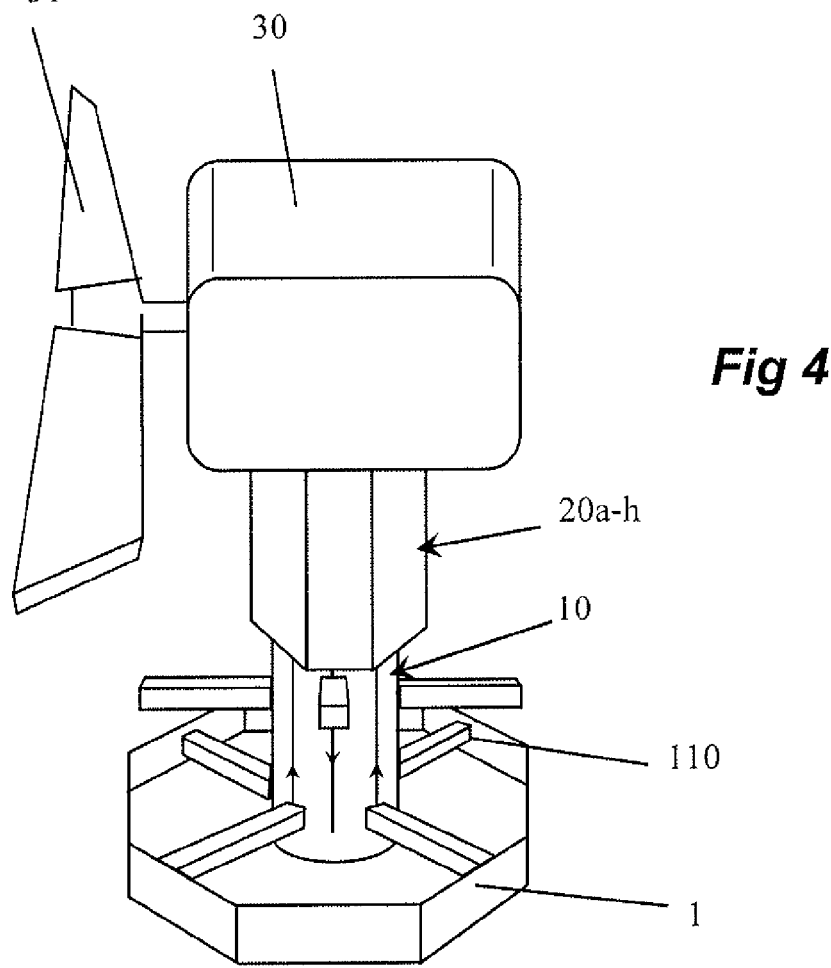
FIG. 4 shows a climber carrying a complete top tower section carrying a nacelle and rotor.

In FIG. 3, two plate shell sections 20a-b have been attached to the climbers 10 holding portion 11. These two plate shell sections 20a-b are then completed by adding six more plate shell sections, thereby forming a complete circumference of a top section of the tower. On top of the top section a nacelle bearing is mounted and a nacelle 30 carrying the rotor 31, generator and other equipment is installed. The design of the nacelle may be of any desired kind, and is well known to a person skilled in the art, whereby it will not be discussed in detail. The complete top section 20 with the nacelle 30 and rotor 31 mounted is shown in FIG. 4.

Figure 5:
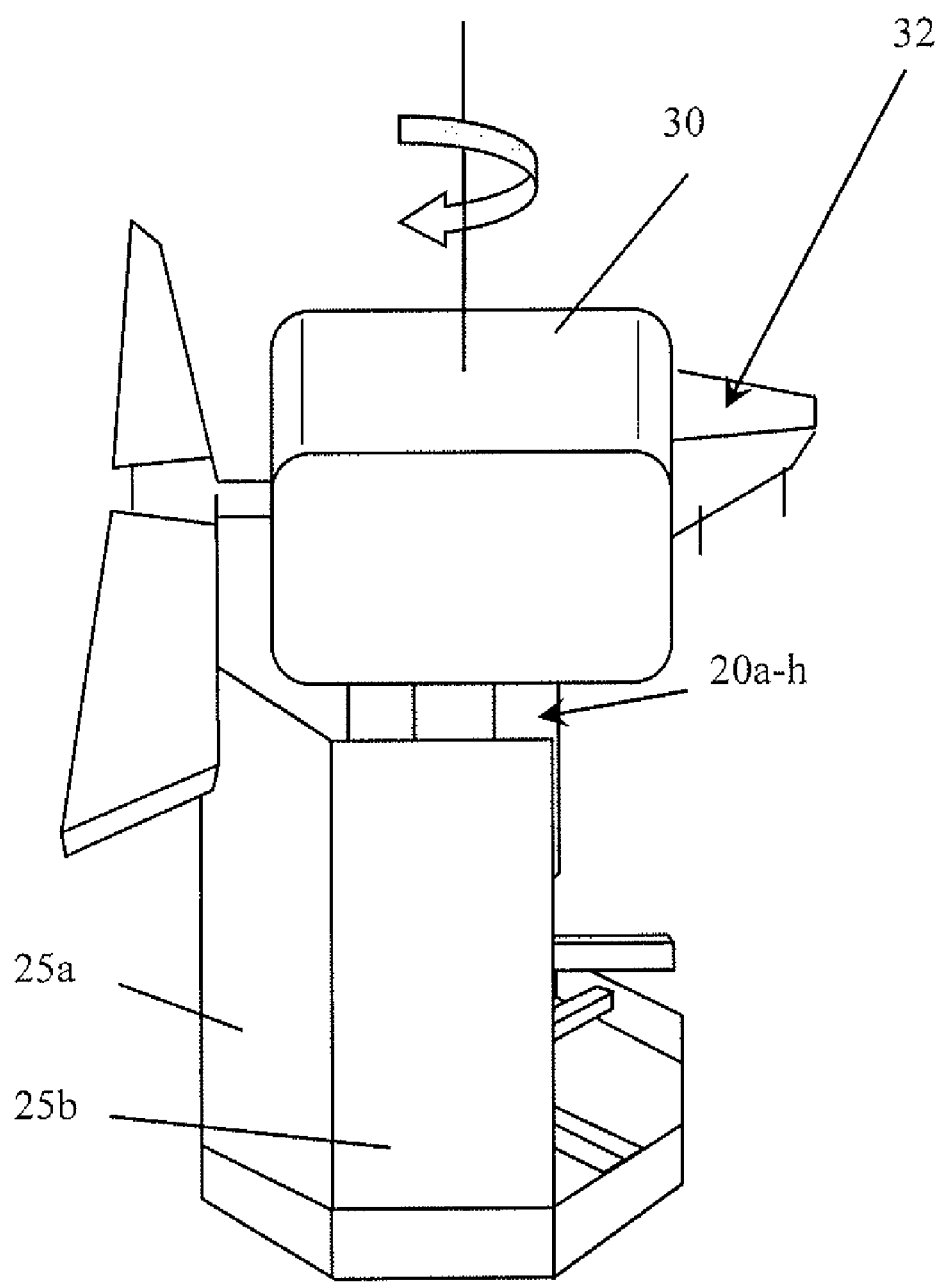
FIG. 5 shows the step of building the lower most tower section.

In the next step (as shown in FIG. 5), the lower most section 25 is built by adding plate shell sections 25a-h forming a complete section 25 carried by the foundation 1. In FIG. 5, the two first plate shell sections 25a and 25b have been attached to the foundation. This section 25 may be built using a crane positioned on the ground or by a crane 32 mounted on the nacelle 30.

The plate shell sections are divided by vertically extending interfaces and do thereby only form part of the circumference. They may thereby be added from the outside in an radial direction. Thereby the tower sections may be built piece by piece, without the already built top section (and the nacelle and rotor) interfering with the mounting of the lower tower sections.

When all the plate shell sections 25a-h of the lower most section 25 have been mounted, the climber 10 is activated.

One set of arms, e.g. the upper arms 12a-d engage the mounted lower most section 25 and lift the climber 10 upwardly relative the lower most section 25. This may e.g. be accomplished by the arms 12a-d moving downwardly along the body 100 of the climber 10 while they are engaging the lower most section 25. It could also be made the other way around, by the arms being in the same position while the body 100 moves relative to the arms. During such relative movement of the body 100, the arms remain in the same vertical level. The second set of arms 12e-h may be used to lift the climber 10 in a following step. During such following step, the first set of arms disengage the lower most section while the second set of arms engages said section. Again, either the second set of arms 12e-h is moved relative to the body 100, or the body is moved relative to the arms. This procedure can be repeated, by the second set of arms 12e-h holding the climber 10 in position while the first set of arms 12a-d are prepared to lift the climber 10 yet another step. Each step of the climber 10 need not correspond to the height of a tower section 25. It is e.g. conceivable that the climber 10 takes several steps along each tower section 25. During such several steps, there can be a reciprocal interaction between the body 100 and the arms 12a-h interacting with the tower section 25 in order to allow climbing. This reciprocal interaction is preferably made not only along the vertical extension of the body 100, but also along the longitudinal extension of the arms 12a-h. The latter allows engagement and disengagement between the arms and the tower sections. While climbing upwardly, the climber 10 carries the top section 20 and the nacelle 30 and the rotor 31.

Figure 6:
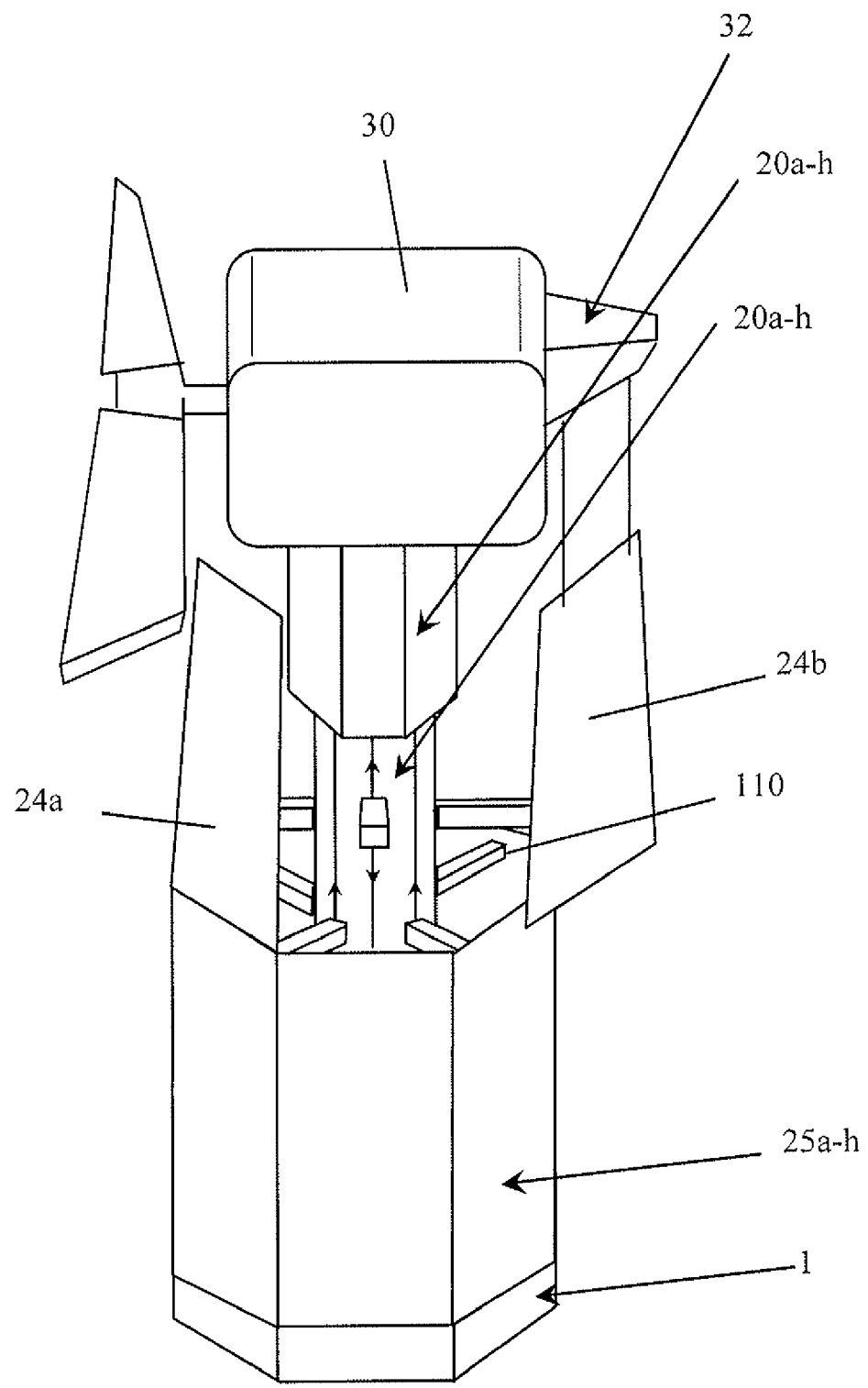
FIG. 6 shows the climber in a state where it has climbed on the lower most tower section and the second lower most tower section is about to the built.

Once the climber 10 has climbed to the desired height relative the lower most tower section 25, the second lower most tower section 24 is mounted on top of the lower most tower section 25 (see FIG. 6). Such additional tower section 24 is mounted in the space formed during climbing between the lower most tower section 25 and the top section 20 carried by the climber 10. In FIG. 6, the first plate shell section 24a has been attached to the lower most tower section 25. The second plate shell section 24b is carried by a crane or second lifting mechanism 32 mounted on the nacelle.

Figure 7:
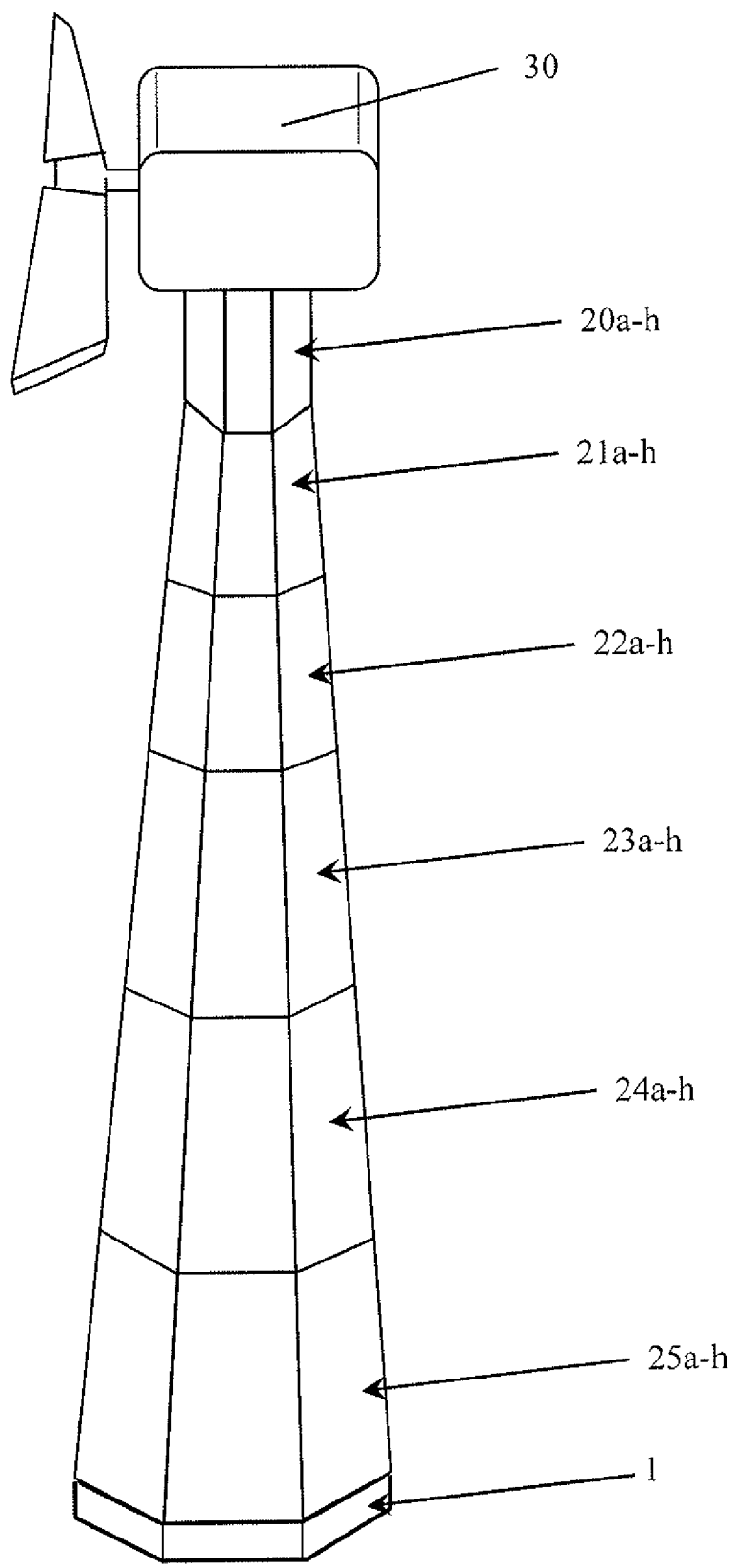
FIG. 7 shows a completed wind turbine tower.

Once the second lower most tower section 24 is mounted the climber 10 is once again activated and climbs relative the second lower most tower section 24. Once it has reached the desired height relative the second lower most tower section 24, the third lower most tower section 23 is mounted on top of the second lower most tower section 24. This continues until the complete tower is built (see FIG. 7).

To summarize, when a lower section 25 has been built, the climber 10 climbs a sufficient length along the vertical extension of the tower in order to form a space between the latest built tower section 25 and the top section 20, which during the procedure is carried by the climber. The climbing, made in one or several steps, is performed to form a space having a vertical extension allowing an additional tower section 24; 23; 22; 21 being built between the recently built lower most tower section 25 and the top section 20.

In one preferred embodiment the plate shell sections are slightly inclined inwardly and upwardly thereby forming a basically conical tower with a larger circumference at the bottom than at the top.

The second upper most tower section 21 may be mounted on top of the third upper most tower section 22 with the upper most tower section in its final place. Alternatively the upper most tower section 20 may be lifted slightly above the second upper most tower section 21 until the second upper most tower section 21 has been finalised and then the upper most tower section 20 is lowered onto the second upper most tower section 21.

Once the complete tower has been built, the crane 32 mounted on the nacelle may be dismounted. Also the climber may be dismounted and e.g. used again for erecting another tower once the complete tower has been built.

It is contemplated that there are numerous modifications of the embodiments described herein, which are still within the scope of the invention as defined by the appended claims.

The climber 10 may engage the inside of the plate shell sections. It may also engage specific grip portions 110 forming part of or being mounted to the plate shell sections.

It may also climb on a specific frame structure built inside the tower. In such an embodiment, the tower sections discussed in detail will form part of the frame structure and the outer surface of the tower will be formed of separate sections.

In one embodiment the plate shell sections are lifted by a crane mounted on the nacelle. Each plate shell section has a relatively limited weight. The nacelle bearing may be used to rotate the nacelle and thereby align the crane and the plate shell section carried by the crane.

It should be noted that a section may be divided in one or more essentially horizontal layers, i.e. it is conceivable that several sub-sections is mounted on top of each other forming a complete section to be climbed on.

The invention claimed is:

1. A method of erecting a tower of a wind turbine plant comprising:
   providing a foundation,
   providing at least one top section of a tower,
   providing a first lifting mechanism adapted to carry the top section of the tower,
   providing at least one lower most tower section onto the foundation,
   lifting the at least one top section of the tower by lifting the first lifting mechanism relative to the at least one lower most tower section,
   adding at least one second lower most section above the at least one lower most tower section,
   lifting the at least one top section of the tower by lifting the first lifting mechanism relative the at least one second lower most tower section,
   wherein the first lifting mechanism includes a climber climbing on the inside of respective lower tower section.

2. The method according to claim 1, wherein the climber includes a body and a first set of arms extending outwardly from the body, and wherein lifting the at least one top section of the tower comprises:
   engaging the first set of arms with the lower most tower section; and
   moving the body upwardly relative to the first set of arms while they are engaging the lower most tower section.

3. The method according to dam 2, wherein the climber further comprises a second set of arms extending outwardly from the body, and wherein lifting the at least one top section of the tower further comprises:

engaging the second set of arms with the lower most tower section;

disengaging the first set of arms from the lower most tower section; and moving the body upwardly relative to the second set of arms while they are engaging the lower most section.

4. The method according to claim 2, wherein the steps of engagement and disengagement of the arms and the upward movement of the body are repeated until a space is formed between the lower most tower section and the top section allowing a new tower section to be but in the space.

5. The method according to claim 2, wherein there is a reciprocal interaction between the body and the arms along the vertical extension of the body, and along the longitudinal extension of the arms.

6. The method according to claim 1, wherein the top section is carrying a nacelle.

7. The method according to claim 6, wherein the nacelle is carrying a rotor blade.

8. The method according to claim 1, wherein the first lifting mechanism extends beneath the top section.

9. The method according to claim 1, wherein the first lifting mechanism extends inside the top section.

10. The method according to claim 1, wherein the lower most tower section or sections are provided by two or more portions divided by interfaces having a vertical extension at least such that each portion only forms a portion of the circumference formed by respective section.

11. The method according to claim 1, wherein the sections are lifted with a second lifting mechanism carried by at least one of the nacelle, the top section, or the climber.

12. The method according to claim 1, wherein the tower is conical.

13. The method according to claim 1, wherein the tower is a plate she tower.

14. The method according to claim 11, wherein rotation of the nacelle in an essentially horizontal plane relative the top section provides means for different orientations of the second lifting mechanism carried by the nacelle.

15. The method according to claim 11, wherein at least parts of the second lifting mechanism is kept in or on the nacelle after the tower is erected and ready for use.

16. The method according to claim 13, wherein the climber, during climbing engages grip portions forming part of, or being mounted to the plate shed sections.

* * * * *

UNITED STATES PATENT AND TRADEMARK OFFICE
CERTIFICATE OF CORRECTION

| | |
|---|---|
| PATENT NO. | : 8,117,799 B2 |
| APPLICATION NO. | : 13/126841 |
| DATED | : February 21, 2012 |
| INVENTOR(S) | : Jonas Kristensen et al. |

It is certified that error appears in the above-identified patent and that said Letters Patent is hereby corrected as shown below:

Title Page, after (65), insert:

--Related U.S. Application Data

(60) Provisional application No. 61,110/657, filed on Nov. 3, 2008.--

Column 1

Line 39, change "an" to --a--.

Column 2

Line 34, change "has" to --have--.

Line 36, after "having" insert --a--.

Column 3

Line 21, change "an" to --a--.

Line 41, after "is" insert --a--.

Lines 53-54, change "mechanisms" to --mechanism--.

Line 57, change "is" to --are--.

Line 62, change "is" to --are--.

Column 4

Line 2, change "allow" to --allows--.

Line 9, change "shows" to --show--.

Line 53, change "are" to --is--.

Column 5

Line 8, change "an" to --a--.

Column 6

Line 37, change "is" to --are--.

Claim 3, Line 66, change "dam" to --claim--.

Signed and Sealed this
Fourteenth Day of August, 2012

David J. Kappos
*Director of the United States Patent and Trademark Office*

CERTIFICATE OF CORRECTION (continued)
U.S. Pat. No. 8,117,799 B2

Column 7

Claim 4, Line 13, change "but" to --built--.

Column 8

Claim 13, Line 12, change "she" to --shell--.

Claim 15, Line 18, change "is" to --are--.

Claim 16, Line 22, change "shed" to --shell--.